Figure 1:
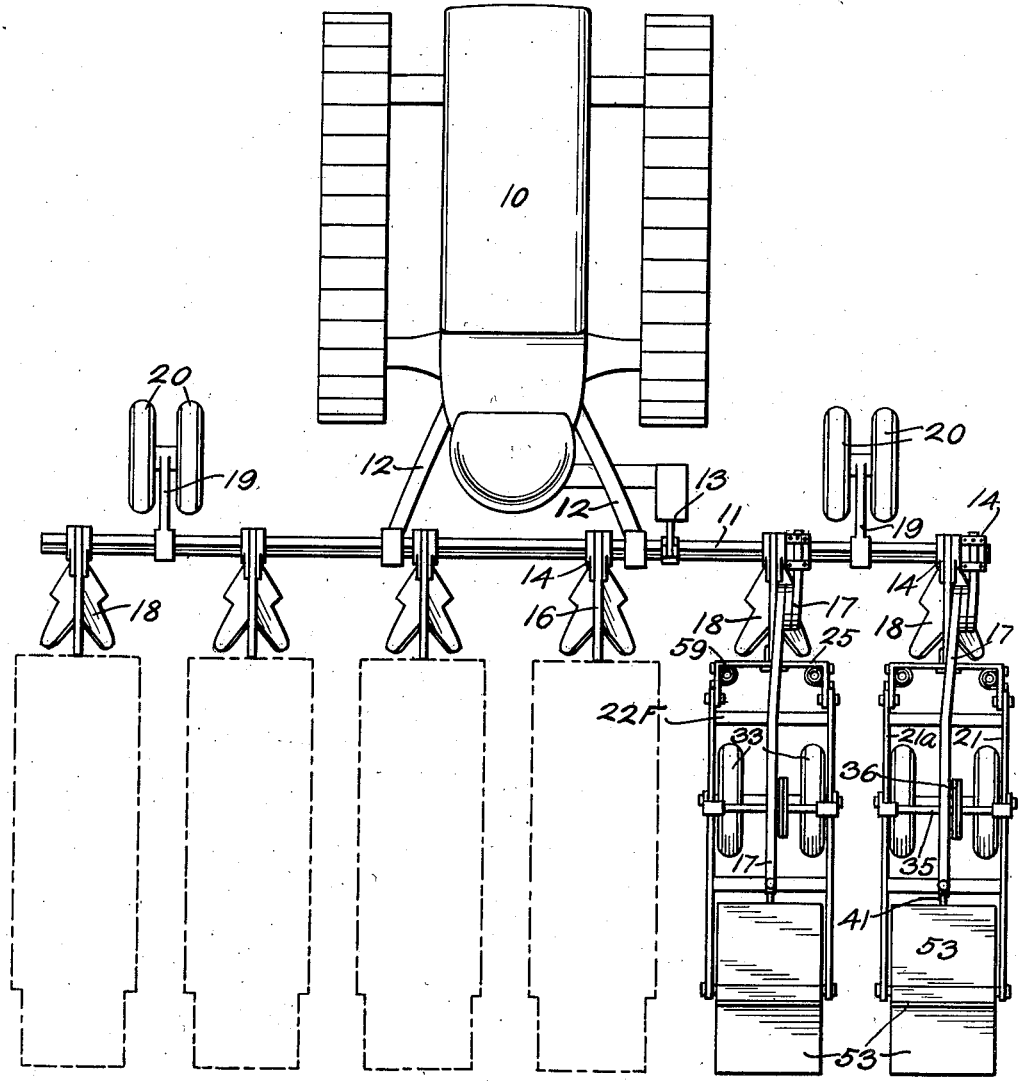

Oct. 23, 1956   L. P. FRANZ   2,767,633
LISTER DAMMER

Filed Aug. 5, 1955   2 Sheets-Sheet 1

INVENTOR.
LEO P. FRANZ
BY
ATTORNEYS

Oct. 23, 1956
L. P. FRANZ
2,767,633
LISTER DAMMER
Filed Aug. 5, 1955
2 Sheets-Sheet 2
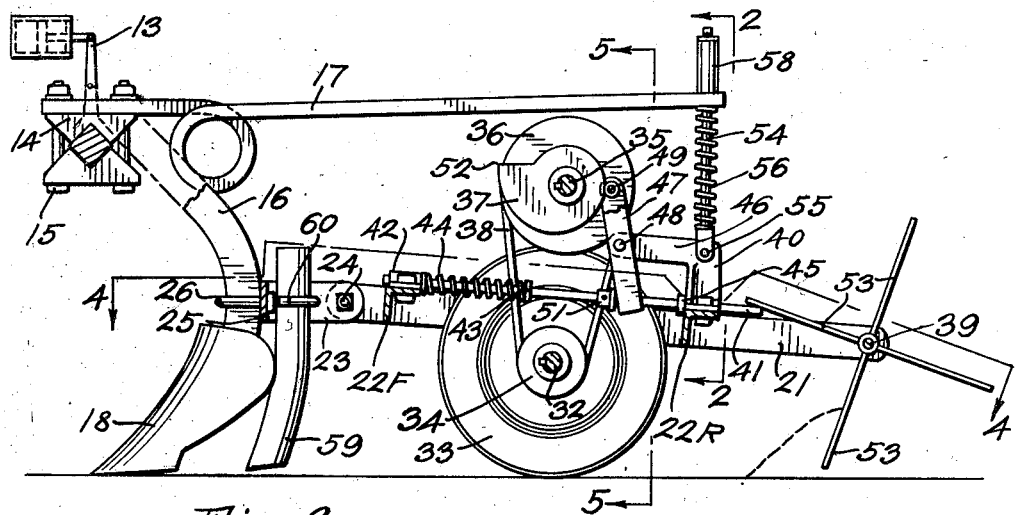
Fig. 3.
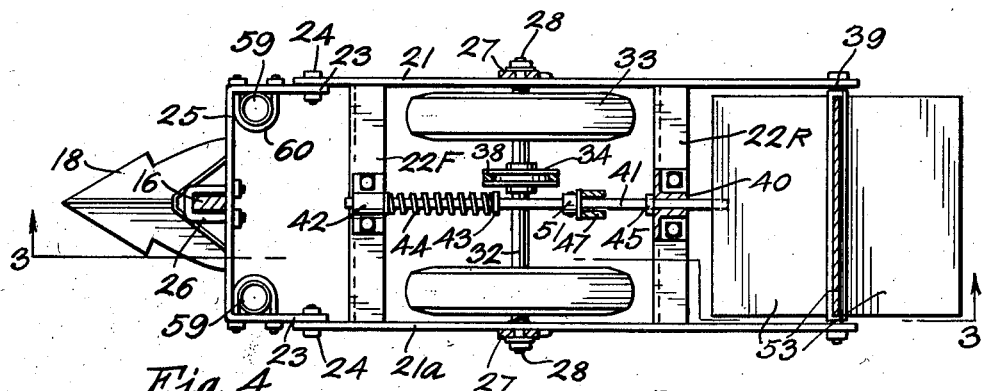
Fig. 4.
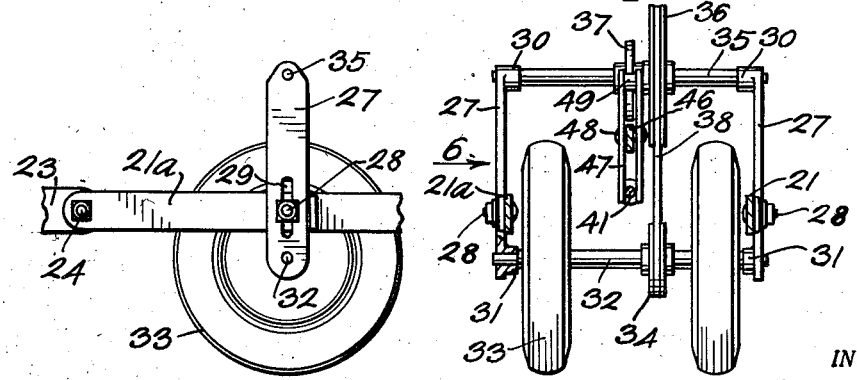
Fig. 6.
Fig. 5.
INVENTOR.
LEO P. FRANZ
BY
ATTORNEYS

United States Patent Office 2,767,633
Patented Oct. 23, 1956

2,767,633
LISTER DAMMER
Leo P. Franz, Ness City, Kans.

Application August 5, 1955, Serial No. 526,643

4 Claims. (Cl. 97—55)

This invention relates to improvements in lister dammers and has reference in greater particular to a mechanism that can be attached to the beam of a lister plow or chisel and will operate to form dams in the chisel furrow at spaced intervals.

In the midwestern plains region of the United States and in many other locations in this and in other countries there is not a sufficient rainfall for an annual crop of grain such as wheat. Such regions are designated by the terms arid or semi-arid. Land in such areas must be handled differently from land where the rainfall is plentiful or at least sufficient for an annual crop.

One widely followed practice is to raise a crop alternate years only the land being fallow the other alternate years during which it is kept as free from weeds as possible, mostly by the use of rod weeders. The absence of vegetable growth prevents the escape of sub-soil moisture that would otherwise be dissipated, and the mulch retards evaporation. By this method a greater portion of the annual rainfall during the fallow years is conserved for the crop years.

In areas where the alternate fallow year system is employed it is still essential for the best results to retain as much as possible of the rainfall during the crop year and for this purpose the grain is planted in the bottoms of lister furrows. Where the land is perfectly level most of the water that falls into the lister furrows will be absorbed by the ground but if the land slants in the direction of the furrows the water flows towards the lower portion of the furrows producing much erosion along the higher portions of the furrows and highly objectionable sedimentation at the lower portions. To remedy these objectionable features machines have been provided that produce spaced dams in the lister furrows, thus providing a large number of pockets that catch the rain and snow and prevents the water from flowing along the furrow.

It is an object of this invention to produce a dammer mechanism of such construction that one can be readily attached to each lister plow or chisel beam without necessitating any material changes in the lister.

Another object is to produce a dammer mechanism provided with two spaced presser wheels that support the dammer from the side walls of the lister furrow and serve in addition to release and latch the dammer blades.

A still further object is to provide a machine having dammer blades provided with straight lower edges and of a length greater than the distance between the furrow sides so as to effect a seed covering function at all points along the furrow without disturbing the seed when the damming follows the seeding operation.

Figures 2, 7:
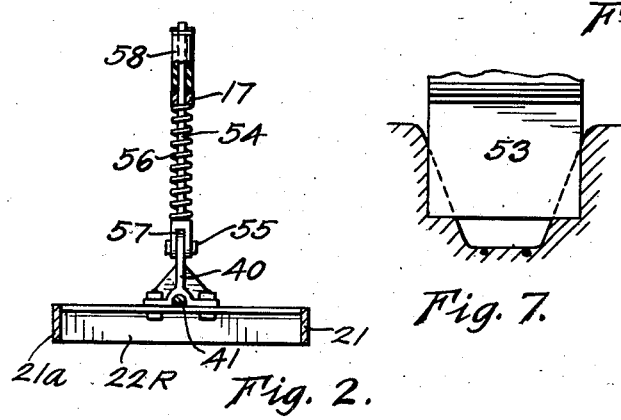

The above and any other objects that may become apparent as the description proceeds or to which attention will be called are attained by means of a construction and an arrangement of parts that will now be described in detail, for which purpose reference will be had to the accompanying drawings in which the invention has been illustrated, and in which:

Figure 1 is a view looking downwardly onto a tractor to which a lister is attached and shows the present dammer attached to adjacent chisel plow beams, the position of the other dammers being outlined by broken lines; only such elements are shown as are necessary for an understanding of the invention;

Figure 2 is a section taken on line 2—2 of Figure 3;
Figure 3 is a view taken on line 3—3 Figure 4;
Figure 4 is a view, partly in section, taken on line 4—4 Figure 3;
Figure 5 is a view, partly in section, taken on line 5—5 Figure 3;
Figure 6 is a fragmentary side elevational view looking in the direction of arrow 6 in Figure 5; and
Figure 7 is a diagram showing the relation of the dammer blade to the lister furrow.

Referring now to the drawing, reference numeral 10 designates a tractor of the caterpillar type which is provided with the usual oil pumps and tool raising means which have not been illustrated in detail and which will, therefore, not be described but will be assumed as being present.

A square tool carrying rod 11 is supported for limited turning movement in supporting means represented by brackets 12. Hydraulic means of the usual type and which has been designated by numeral 13 serves to turn bar 11 when desired. Attached to bar 11 by suitable means such as clamps 14 and bolts 15 are chisel plow beams 16. Springs 17 have their front ends attached to bar 11 by clamps similar to those securing the beams in place. Attached to the lower ends of beams 16 are chisels or plows 18. Arms 19 are attached to bar 11, one near each end, by clamps similar to those above described. Attached to the ends of each of said arms are two pneumatic tired gauge wheels 20 that govern the depth to which the furrow is cut. Applicant's addition to the conventional lister plow or seeder resides in the damming attachment including the resilient support 17 which will now be described.

The dammer mechanism consists of a rectangular frame having flat steel bar sides 21 and 21a connected by front and rear spacer bars 22F and 22R respectively. The front ends of the side bars are hingedly connected with the rear ends of sides 23 by means of pivots 24. Sides 23 are integral with bar 25 which is connected at its center point to beam 16 by means of a U-bolt 26 as shown in Figures 3 and 4. The U-bolt connecting means holds bar 23, 23 and 25 from rocking about the beam and pivots 24 allow the frame to tilt about pivots 24 but cannot swing laterally relative to the beam. Clamped to each of the side bars 21 is a flat bar 27 by means of bolts 28 that pass through slots 29. The upper and lower ends of bars 27 are provided respectively with tubular hubs 30 and 31. An axle 32 has its ends pivoted in hubs 31, as shown in Figure 5 and carries two packer wheels 33 that are spaced apart as shown. At least one of the packer wheels is keyed to the shaft. A V-pulley 34 is keyed to the shaft at a point between wheels 33, as shown. A shaft 35 has its ends mounted for rotation in hubs 30 and carries a V-pulley 36 and a cam 37. A V-belt 38 is operatively associated with pulleys 34 and 36 as shown in Figures 3 and 5. In the drawing no attempt has been made to show the correct ratio between the diameters of pulleys 34 and 36. Side bars 21 and 21a extend rearwardly beyond cross bar 22R and are provided with bearings for the dammer scraper blade shaft 39. Supported on the top flange of bar 22R is a member, preferably a steel casting 40, one of whose functions it is to form a guide for the rear end of detent bar 41. Another casting 42 is attached to the front cross bar 22f which forms a guide for the front end of detent bar 41 which has a washer like stop member 43. A helical compression spring 44 is positioned between the guide casting 42 and the stop 43 and is under compressive strain urging the detent bar rearwardly. Bar 41 may be provided with a collar 45 that limits its rearward movement although other means has been shown and will presently be described for limiting the rearward movement of the detent bar. Casting 40 has a forwardly extending arm 46 to the front end of which a lever 47 is rockably connected by a pivot 48. Lever 47 comprises two parts which are located on opposite sides of arm 46 and a roller 49 is positioned between the two parts of the lever and mounted for rotation on a journal or pivot. The detent bar is provided with a fixed collar 51 that is urged against the forward edges of levers 47 by the action of spring 44 and this urges the roller against the periphery of the cam. It is clear from an inspection of Figure 3 that when the cam is rotated in a counter-clockwise direction the spiral periphery will cause a clockwise rotation of lever 47, which in turn moves the detent rod forwardly until finally the roller reaches the point 52 of the cam, whereupon, after further rotation of the cam, the roller drops onto the lowest surface of the cam periphery, and permits the detent bar to resume the position shown in Figure 4. Mounted on shaft 39 is a dam forming scraper having four blades 53. The rear end of the detent bar serves as a stop when it is in its rearmost position (Figures 3 and 4) and during the forward movement of the parts the lowermost blade scrapes loose ground from the side of the lister furrow and this accumulates as indicated by the dotted line in Figure 3. When the point of the cam passes the roller the detent bar releases the scraper blade which then starts turning and when the detent bar is returned to the position shown in the drawing it will be engaged by the next blade but in the meantime the accumulated soil will be left in the furrow forming a dam. The distance between the dams depends on the diameter of wheels 33 and the relative diameters of pulleys 34 and 36. It is now apparent that when the machine moves forwardly (to the left in Figures 3 and 4), a series of spaced dams will be formed in the furrow.

In Figure 3 a heavy spring bar 17 has been shown. The rear end of bar 17 has a hole through which rod 54 passes. The lower end of rod 54 is connected to casting 40 by a pivot 55. A helical compression spring 56 is positioned about rod 17 and the forked member 57 and the parts are so proportioned and related that when the parts are in the position shown spring 56 is under compression and adds a downward pressure to the action of gravity.

When the lister is not operating rod 11 is turned counter-clockwise by the hydraulic mechanism and this raises the chisel plows to an inoperative position. The dammer mechanism is connected with the plow beams by pivots 24 and is raised by the resilient bar 17. A rubber buffer 58 is positioned above the bar 17 and an abutment member at the upper end of rod 54, as shown in Figure 2.

Attention is called to the fact that the dammer mechanism has no lateral movement relative to the plow beams but merely a pivotal movement about pivots 24 and, therefore, the dammers must be raised before turns can be made.

The lister plow shown is so constructed that a seeder mechanism can be added for the seeding operation. The seeder is operated from wheels 20 and the seed is fed into the seeder pipes 59 two of which have been shown attached to side bars 23 by U-bolt 60. In the embodiment illustrated two rows of grain will be planted in each lister furrow.

In Figure 7 the relationship between the scraper blade, the seed bed and the furrow has been illustrated.

It is to be understood that such features as are old in the art can be added to the assembly and that the dammer frame can be strengthened by braces and that the most suitable structural members can be substituted for those shown.

What is claimed as new is:

1. In a lister furrow dammer, in combination with a lister plow beam and means for turning the same about a horizontal pivot, an elongated open frame having spaced side bars, spacer bars joining the side bars, one near the front ends and the other spaced forwardly from the rear ends, a widened U-shaped member having its parallel sides pivotally connected with the front ends of the spaced sides, means positioned substantially at the mid-point of the base of said U-shaped member for rigidly attaching it to the rear of the plow beam, an axle bearing positioned below and attached to each side bar, a presser wheel axle journaled in the bearings, two spaced presser wheels mounted on the axle, at least one of the wheels being non-rotatably connected therewith, a belt pulley non-rotatably attached to the axle at a point between the presser wheels, a cam shaft bearing positioned above and attached to each side bar, a cam shaft journaled in the last named bearings, a belt pulley on the cam shaft in alignment with the corresponding pulley on the presser wheel axle, a belt encircling the two pulleys, a spiral cam non-rotatably associated with the cam shaft, a dam forming instrumentality having a plurality of intersecting radial scraper blades mounted between the rear ends of the spaced side bars for rotation about the axis of the blade intersection, a detent bar resting on the upper surfaces of both spacer bars, guide blocks for the detent bar attached to the spacer bars, spring means operatively associated with the frame and the detent bar urging the latter rearwardly into a position where it provides a stop for the dammer blade assembly, means comprising a lever mounted for rocking movement about a pivot supported on the rear spacer bar, stop means on the detent bar positioned to engage the lower end of the lever, the upper end of the lever having a roller resting on the peripheral surface of the cam, the latter having a spiral cam surface which, as the cam turns, imparts to the lever a gradual rocking movement about its pivot thereby moving the detent rod forwardly to scraper releasing position and immediately thereafter releasing the detent rod permitting it to return to scraper blade stopping position.

2. A device in accordance with claim 1 in which the presser wheel axle and the cam shaft are rigidly interconnected and spaced a fixed distance apart and in which both of said shafts can be simultaneously adjusted vertically with respect to the frame.

3. A device in accordance with claim 1 in which a resilient bar has its front end operatively connected with the plow beam, extends rearwardly to a point behind the presser wheels and has its rear end connected with said frame by means of a tension rod so that when the plow beam is raised the resilient bar will raise the frame.

4. A device in accordance with claim 3 in which a helical spiral spring surrounds that portion of the tension bar between the lower surface of the resilient bar and the frame and in which the parts are so proportioned that during normal operation the spring is in a compressed state and exerts a downward pressure on the frame.

References Cited in the file of this patent
UNITED STATES PATENTS

| | | |
|---|---|---|
| 2,205,038 | Hisermann | June 18, 1940 |
| 2,308,536 | Peacock | Jan. 19, 1943 |
| 2,318,562 | Silver et al. | May 4, 1943 |
| 2,551,870 | Bridger | May 8, 1951 |